(12) United States Patent
Zhang et al.

(10) Patent No.: US 12,107,795 B2
(45) Date of Patent: Oct. 1, 2024

(54) SOUNDING REFERENCE SIGNAL BASED DOWNLINK TRANSMISSION CONFIGURATION INDICATION

(71) Applicant: Apple Inc., Cupertino, CA (US)

(72) Inventors: Yushu Zhang, Beijing (CN); Haitong Sun, Cupertino, CA (US); Dawei Zhang, Saratoga, CA (US); Haijing Hu, Los Gatos, CA (US); Wei Zeng, Saratoga, CA (US); Hong He, San Jose, CA (US); Chunhai Yao, Beijing (CN); Yuchul Kim, San Jose, CA (US); Yuqin Chen, Beijing (CN); Fangli Xu, Beijing (CN); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 17/760,551

(22) PCT Filed: Sep. 29, 2019

(86) PCT No.: PCT/CN2019/108879
§ 371 (c)(1),
(2) Date: Mar. 15, 2022

(87) PCT Pub. No.: WO2021/056509
PCT Pub. Date: Apr. 1, 2021

(65) Prior Publication Data
US 2022/0360398 A1 Nov. 10, 2022

(51) Int. Cl.
*H04L 5/00* (2006.01)
(52) U.S. Cl.
CPC ............ *H04L 5/006* (2013.01); *H04L 5/0094* (2013.01)

(58) Field of Classification Search
CPC .............................. H04L 5/006; H04L 5/0094
See application file for complete search history.

(56) References Cited

U.S. PATENT DOCUMENTS

2019/0254120 A1   1/2019  Zhang
2020/0280409 A1*  9/2020  Grant .................... H04L 5/0044
(Continued)

FOREIGN PATENT DOCUMENTS

CN    102457321 A    5/2012
CN    109076551      12/2018
(Continued)

OTHER PUBLICATIONS

International Search Report and Written Opinion for PCT/CN2019/108879; 9 pages; Jun. 30, 2020.
(Continued)

*Primary Examiner* — Kevin C. Harper
(74) *Attorney, Agent, or Firm* — Kowert, Hood, Munyon, Rankin & Goetzel, P.C.

(57) ABSTRACT

To reduce the beam reporting latency, a base station may include a sounding reference signal (SRS) indication to a wireless communication device (UE) as part of the transmission configuration information (TCI) transmitted to the UE, allowing the UE to receive a corresponding downlink signal using the same beam (or with the same beam) the UE used to transmit (or with which the UE transmitted) the SRS indicated in the TCI. The SRS may be one of multiple SRSs previously transmitted by the UE. The UE may transmit the multiple SRSs periodically and/or according to semi-persistent scheduling, or it may transmit them aperiodically. Therefore, the UE does not need to report the beam quality, and the base station may perform the necessary beam measurement(s) instead. Various parameters and conditions may be defined for the UE to support SRS-based TCI.

20 Claims, 12 Drawing Sheets

(56) References Cited

U.S. PATENT DOCUMENTS

| | | | | |
|---|---|---|---|---|
| 2020/0287677 A1* | 9/2020 | Kakishima | .......... | H04W 72/046 |
| 2021/0067979 A1* | 3/2021 | Rahman | ................ | H04L 5/0023 |

FOREIGN PATENT DOCUMENTS

| | | | | |
|---|---|---|---|---|
| CN | 109155662 | | 1/2019 | |
| EP | 3991311 | | 5/2022 | |
| WO | 2017185979 A1 | | 11/2017 | |
| WO | 2018131945 A1 | | 7/2018 | |
| WO | 2018140176 | | 8/2018 | |
| WO | WO-2018144384 A1 * | | 8/2018 | ........... H04B 7/0693 |
| WO | 2019096129 A1 | | 5/2019 | |

OTHER PUBLICATIONS

Nokia et al. "Enhancements on Multi-beam Operation;" 3GPP TSG RAN WG1 Meeting #97 R1-1907317; Reno, USA; 20 pages; May 17, 2019.

Nokia et al. "Enhancements on Multi-beam Operation;" 3GPP TSG RAN WG1 Meeting #95 R1-1813490; Spokane, USA; 15 pages; Nov. 16, 2018.

Nokia et al. "Enhancements on Multi-beam Operation;" 3GPP TSG RAN WG1 Meeting #94-bis R1-1811408; Chengdu, China; 14 pages; Oct. 12, 2018.

Extended European Search Report for EP Patent Application No. 19946574.1; Apr. 5, 2023.

Samsung "Enhancements on multi-beam operations"; 3GPP TSG RAN WG1 97 R1-1906969; Reno, USA; May 13, 2019.

Fraunhofer IIS et al. "Enhancements on UE multi-beam operation"; 3GPP TGS RAN WG1 Meeting #97 R1-1908973; Prague, Czech; Aug. 26, 2019.

Office Action for Chinese Patent Application No. 201980100697.0; Apr. 18, 2024.

Office Action for KR Patent Application No. 10-2022-7010392; Feb. 23, 2024.

CMCC "Discussion on Remaining Issues on SRS"; 3GPP TSG RAN WG1 #94bis R1-1811030; Oct. 8, 2018.

Ericsson "UL beam selection improvements" 3GPP TSG RAN WG1 #AH R1-1901205; Jan. 21, 2019.

Ericsson "Enhancements to multi-beam operation"; 3GPP TSG RAN WG1 #98 R1-1909225; Aug. 26, 2019.

* cited by examiner

SOUNDING REFERENCE SIGNAL BASED DOWNLINK TRANSMISSION CONFIGURATION INDICATION

PRIORITY CLAIM INFORMATION

This application is a national stage application of International Application No. PCT/CN2019/108879, filed on Sep. 29, 2019, titled "Sounding Reference Signal Based Downlink Transmission Configuration Indication", which is hereby incorporated by reference in its entirety as though fully and completely set forth herein.

FIELD OF THE INVENTION

The present application relates to wireless communications, and more particularly to providing Sounding Reference Signal (SRS) Based Downlink Transmission Configuration Indication (TCI) during wireless communications, e.g. during 3GPP New Radio (NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A proposed next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In many instances, modern wireless communications networks use MIMO (multiple-in-multiple-out) technology to achieve high data rates. One MIMO technique is beamforming, which permits targeted illumination of specific areas, making it possible to improve transmission to users at the far edges of cellular coverage. Many wireless communications standards such as WLAN and WiMAX™, LTE and NR incorporate beamforming among their many features. Beamforming is particularly important for the time division duplex (TDD) mode in LTE and NR.

Wireless communication standards, e.g. 3GPP LTE and 3GPP NR also make provisions for additional signaling intended to improve communications. One example is the Sounding Reference Signal (SRS), which is a reference signal transmitted by the UE in the uplink direction and is used by the base station to estimate the uplink channel quality over a wider bandwidth. The base station may use this information for uplink frequency selective scheduling, and may also use SRS for uplink timing estimation as part of a timing alignment procedure, particularly when there are no PUSCH/PUCCH transmissions in the uplink for an extended period of time, therefore relying on SRS for uplink timing estimation. SRS does not need to be transmitted in the same physical resource blocks where PUSCH is transmitted as SRS may stretch over a larger frequency range.

Another useful feature in wireless communications, for example in beamforming, is the possible leveraging of reference signals associated with one channel to ascertain communication conditions associated with another channel. Accordingly, reference signals associated with different respective channels may be considered have a quasi-co-located (QCL) relationship, determined based on the respective antennas associated with those reference signals. Thus, two antenna ports are considered to be QCL if properties of the channel over which a symbol on one antenna port is conveyed can be inferred from the channel over which a symbol on the other antenna port is conveyed. For example two reference signal transmitted by the same antenna array and applying the same spatial filter would go through similar channel conditions and have similar channel properties. Since the reference signals have similar channel properties, the UE may detect one of the reference signals and may apply the channel properties of that reference signal to detect the other reference signal. Hence, the two reference signals are considered to be QCL.

Indication of QCL relationships may be provided to the UE in Downlink Control Information (DCI) as part of a transmission configuration indication (TCI). The TCI may include configurations such as QCL-relationships between the downlink reference signals (DL-RSs) in one Channel State Information RS (CSI-RS) set and the PDSCH Demodulation Reference Signal (DMRS) ports. Each TCI state can contain parameters for configuring a QCL relationship between one or two downlink reference signals and the DMRS ports of the PDSCH, the DMRS port of PDCCH or the CSI-RS port(s) of a CSI-RS resource. In the efforts to improve reporting latency, further improvements in the transmission of TCI are desired.

Other corresponding issues related to the prior art will become apparent to one skilled in the art after comparing such prior art with the disclosed embodiments as described herein.

SUMMARY OF THE INVENTION

Embodiments are presented herein of, inter alia, of methods for implementing transmission of a sounding reference signal (SRS) based downlink transmission configuration indication (TCI), for example during 3GPP New Radio (NR) communications. Embodiments are further presented herein for wireless communication systems containing user equipment (UE) devices and/or base stations communicating with each other within the wireless communication systems.

In order to reduce beam reporting latency, an SRS-based downlink beam indication, or SRS-based downlink TCI may be implemented. The UE may transmit multiple SRSs with different beams, and the base station may indicate one of the SRSs to the UE in a TCI. Based on the SRS indication, the UE may use the same beam to receive the downlink signal as the beam that the UE used to transmit the SRS. Consequently, the UE does not need to report the beam quality, as the base station may perform the necessary beam measurement(s) instead.

Pursuant to the above, a UE may successively transmit multiple SRSs to a base station, which includes the UE using a first beam to transmit a first SRS. The UE may receive in a TCI from the base station, at least in response to the base station receiving the first SRS, an indication of the first SRS of the multiple SRSs. The UE may then use the first beam, at least in response to receiving the indication of the first SRS, to receive from the base station a downlink signal corresponding to the first SRS. The first SRS may be transmitted a specified number of slots prior to receiving the TCI from the base station, or a specified number of slots prior to receiving the downlink signal from the base station. The specified number of slots in this case may represent spatial relation information corresponding to the indication of the SRS received by the UE in TCI, and the UE may use (or follow) this information to determine which beam to use for receiving the downlink signal. The TCI may be received in a physical control channel corresponding to the first SRS, and the downlink signal may be received in a physical data channel corresponding to the first SRS. The specified number may be a predefined number, a number configured through higher layer signaling, or it may be reported by device capability signaling.

In some embodiments, each of the multiple SRSs may be transmitted using a same beam when the multiple SRSs are periodic or semi-persistent SRSs. In cases where the multiple SRSs are aperiodic, that is, they are not periodic or semi-persistent SRSs, the first SRS may be a most recently transmitted SRS prior to receiving the corresponding downlink signal. In some embodiments, the first beam may be identified based on a latest indicated spatial relation information for SRS.

In some embodiments, the TCI state with SRS as source reference signal may not be configured for CORESET 0 or any of the CORESETs. The UE may monitor CORESET 0 associated with a specific synchronization signal block until receiving a new TCI or until a random access channel procedure is not triggered by a physical control channel ordered physical random access procedure. The SRS may be an SRS for beam management, an SRS for codebook-based transmission, an SRS for non-codebook-based transmission and/or an SRS for antenna switching. The downlink signal may be a physical data channel, a channel state information reference signal (CSI-RS) with repetition on, a CSI-RS with repetition off, a CSI-RS with tracking reference signal (TRS) information configured, a CSI-RS without repetition and without TRS-information configured, or a CORESET. The first SRS may indicate quasi-colocation parameters which may include spatial receiving parameters, delay offset, Doppler shift, delay spread, and/or Doppler spread. The first SRS may be transmitted in a same serving cell as the downlink signal or in a different serving cell than the downlink signal. A serving cell index for the first SRS and/or a bandwidth part index for the first SRS may be configured through higher layer signaling, e.g. via radio resource control (RRC) signaling. In some embodiments, the base station may assume that the downlink signal can be received simultaneously when corresponding source SRSs are configured in different resource sets with a same usage, or when the corresponding source SRSs are configured in different panel identifiers with a same usage.

In some embodiments, a base station may receive, from a device, a first SRS transmitted by the device using a first beam, and may transmit in TCI, at least in response to receiving the first SRSs, an indication of the first SRS to have the device receive a downlink signal using the first beam. The base station may then transmit, to the device, the downlink signal, which the device may receive using the first beam.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
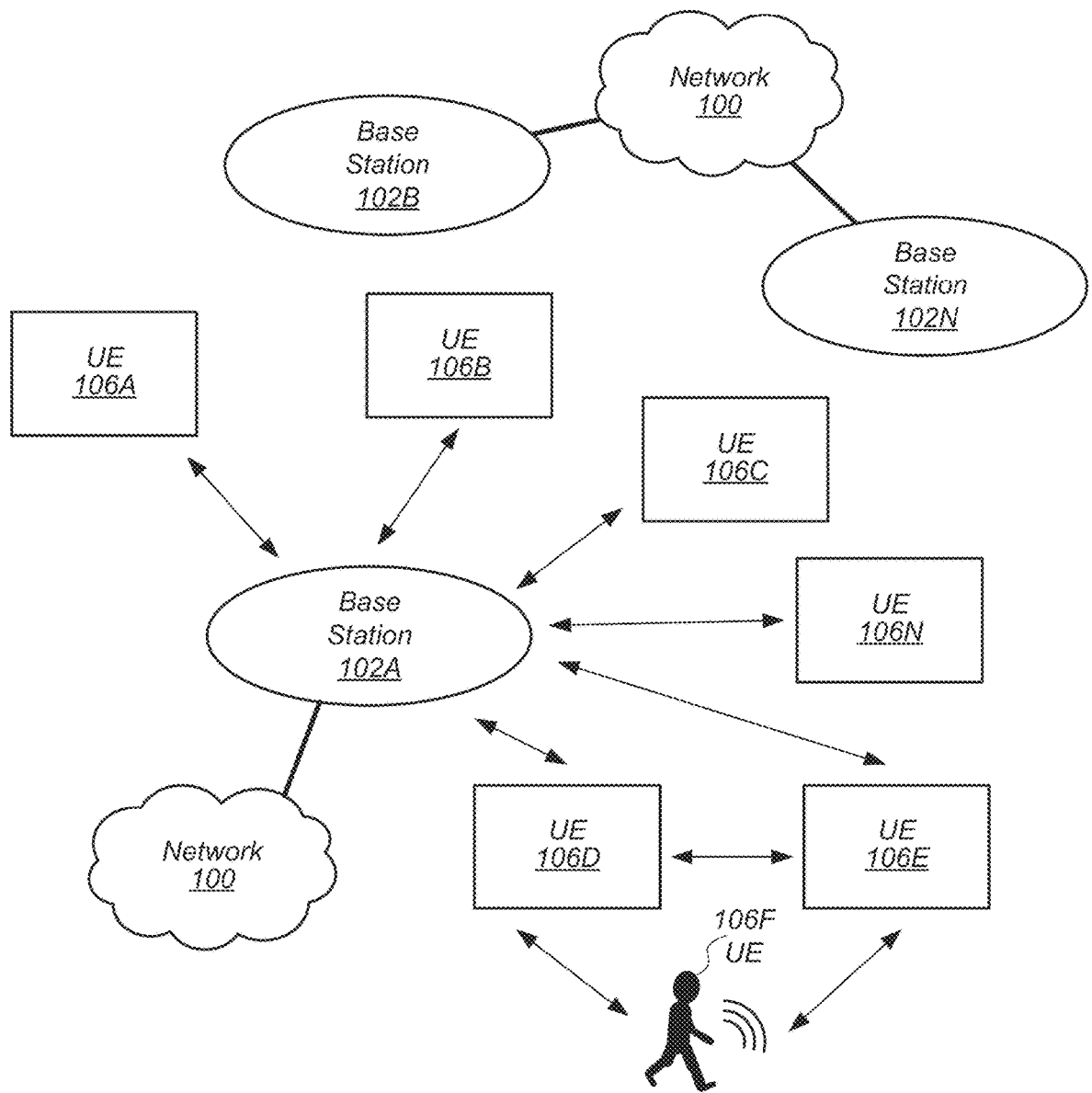
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

APR: Applications Processor
BS: Base Station
BSR: Buffer Size Report
CMR: Change Mode Request
CRC: Cyclic Redundancy Check
CSI: Channel State Information
DCI: Downlink Control Information
DL: Downlink (from BS to UE)
DYN: Dynamic
FDD: Frequency Division Duplexing
FT: Frame Type
GC-PDCCH: Group Common Physical Downlink Control Channel
GPRS: General Packet Radio Service
GSM: Global System for Mobile Communication
GTP: GPRS Tunneling Protocol
IR: Initialization and Refresh state
LAN: Local Area Network
LTE: Long Term Evolution
MAC: Media Access Control
MAC-CE: MAC Control Element
MIB: Master Information Block
MIMO: Multiple-In Multiple-Out
OSI: Open System Interconnection
PBCH: Physical Broadcast Channel
PDCCH: Physical Downlink Control Channel
PDCP: Packet Data Convergence Protocol
PDN: Packet Data Network
PDSCH: Physical Downlink Shared Channel
PDU: Protocol Data Unit
QCL: Quasi Co-Location
RACH: Random Access Procedure
RAT: Radio Access Technology
RF: Radio Frequency
RMSI: Remaining Minimum System Information
ROHC: Robust Header Compression
RRC: Radio Resource Control
RS: Reference Signal (Symbol)
RSI: Root Sequence Indicator
RTP: Real-time Transport Protocol
RX: Reception/Receive
SID: System Identification Number
SGW: Serving Gateway
SRS: Sounding Reference Signal
SS: Search Space
SSB: Synchronization Signal Block
TBS: Transport Block Size
TC: Transmission Configuration Indication
TDD: Time Division Duplexing
TRS: Tracking Reference Signal
TX: Transmission/Transmit
UE: User Equipment
UL: Uplink (from UE to BS)
UMTS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc.

Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Transmission Scheduling—In cellular radio communications, signal and data transmissions may be organized according to designated time units of specific duration during which transmissions take place. For example, in 3GPP LTE, transmissions are divided into radio frames, each radio frame being of equal (time) duration (e.g. each radio frame is 10 ms). A radio frame in LTE may be further divided into ten subframes, each subframe being of equal duration, with the subframes designated as the smallest (minimum) scheduling unit, or the designated time unit for a transmission. Similarly, a smallest (or minimum) scheduling unit for 5G NR (or NR, for short) transmissions is referred to as a "slot". Accordingly, as used herein, the term "slot" refers to a smallest (or minimum) scheduling time unit for the wireless communications being described. However, as noted above, in different communication protocols such a scheduling time unit may be named differently, e.g. a "subframe" in LTE, etc.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
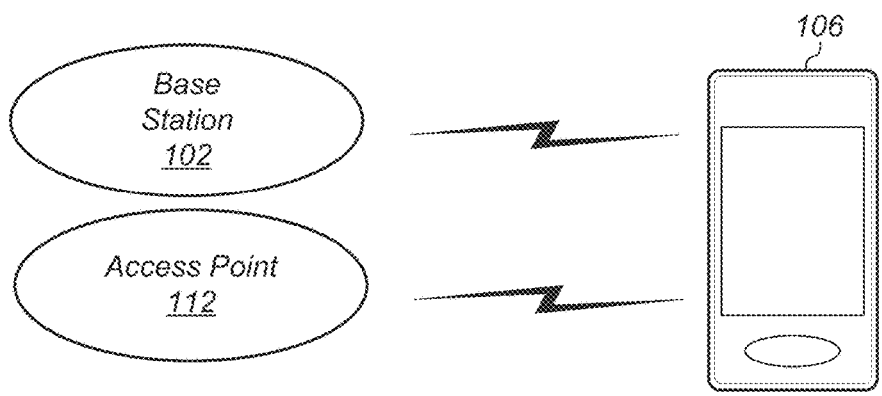
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may use SRS-based downlink TCI according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station(s) 102 are implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station(s) 102 may transmit SRS-based downlink TCI, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities).

Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-102N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE(s) 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UEs 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UE(s) 106, e.g. 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Further aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, .g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
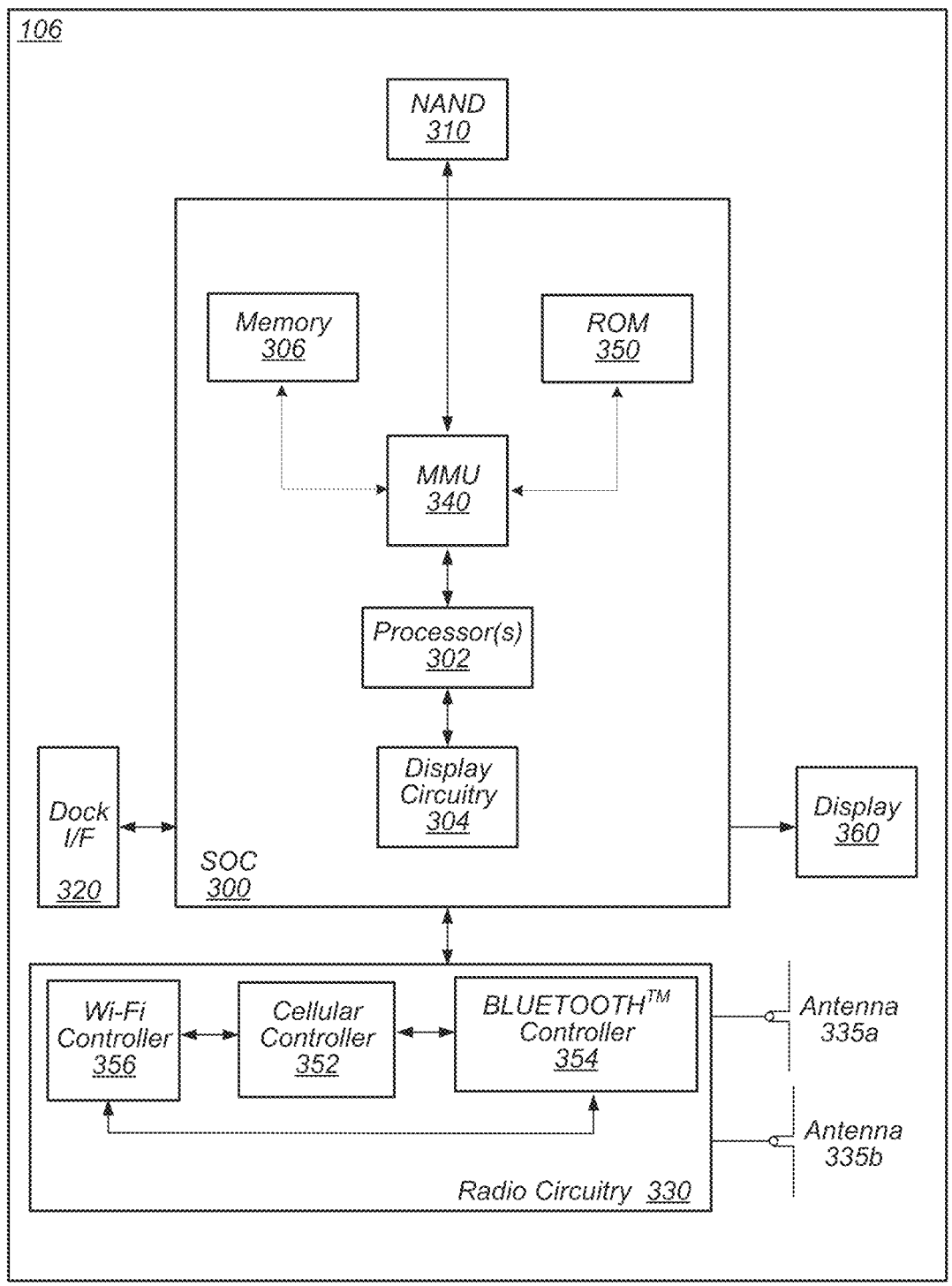
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station(s) 102) may include hardware and software components for implementing methods for at least UE 106 to use SRS-based downlink TCI as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to use SRS-based downlink TCI according to various embodiments disclosed herein. Processor(s) 302 may also implement various other applications and/or end-user applications running on UE 106.

Figure 5:
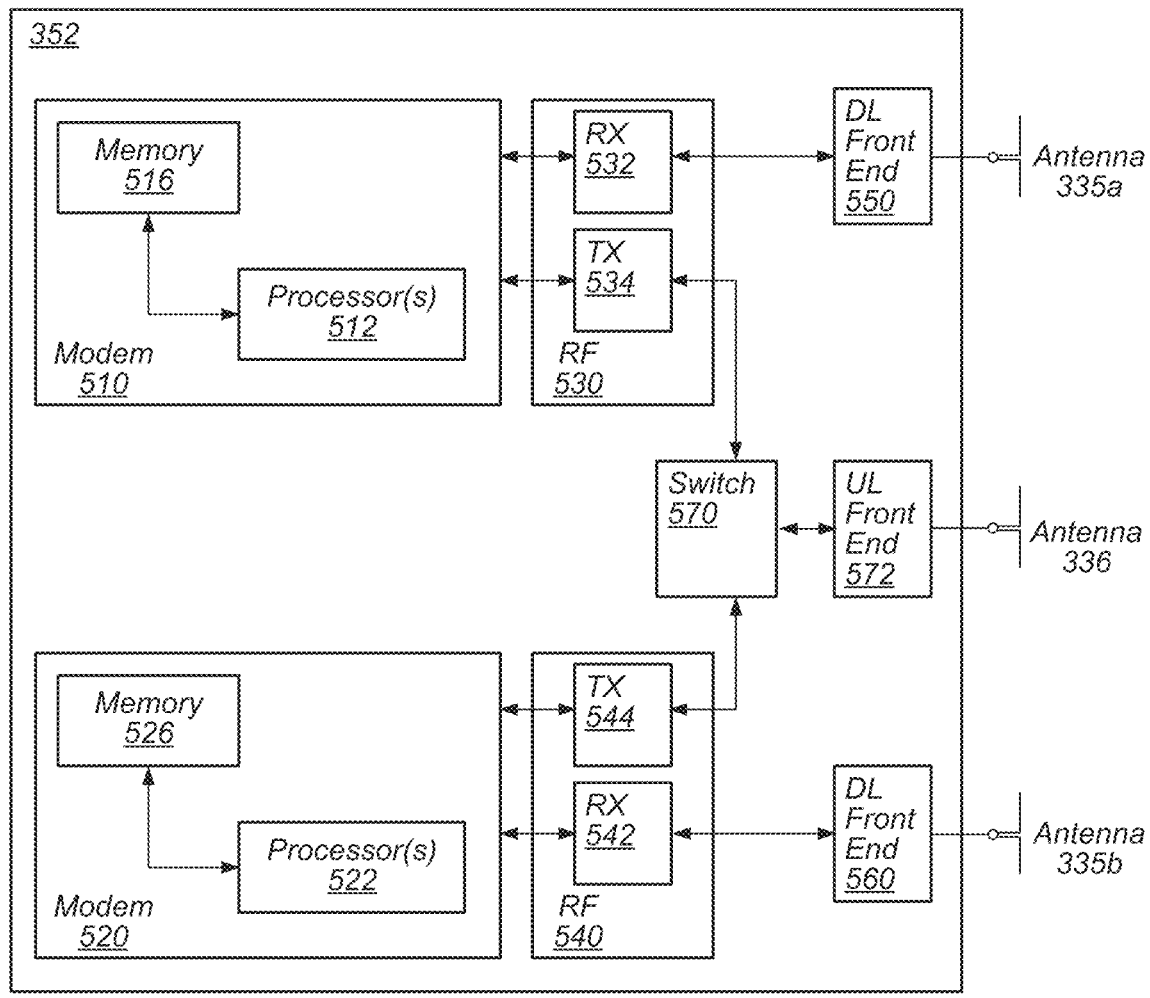
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 and will be further described below.

Figure 4:
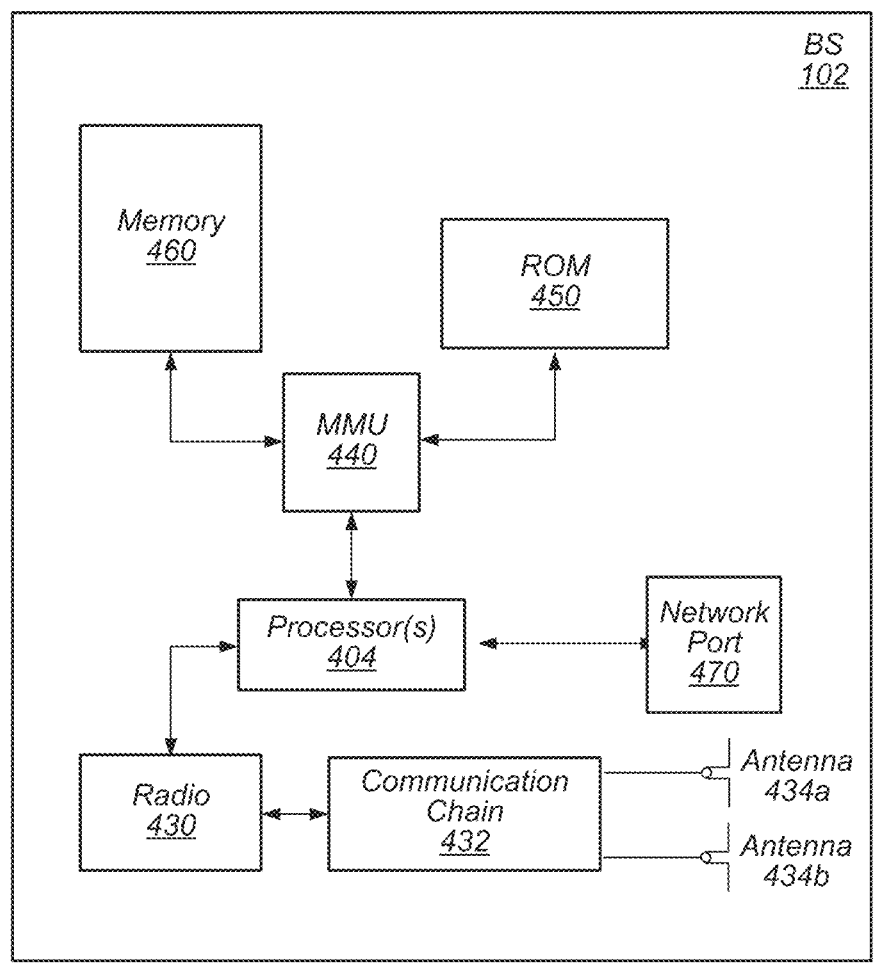
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna(s) 434. Antenna(s) 434 may be configured to operate as a wireless transceiver and may be further configured to communicate with UE devices 106 via radio circuitry 430. The antenna(s) 434 may communicate with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that uses SRS-based downlink TCI as disclosed herein. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for transmitting SRS-based downlink TCI.

FIG. 5—Block Diagram of Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

SRS-Based TCI

One possible way to reduce beam reporting latency is to support an SRS-based downlink beam indication, or downlink TCI. The UE may transmit multiple SRSs with different beams, and in turn the base station may indicate one of the SRSs to the UE in a TCI. Based on the SRS indication, the UE may use the same beam to receive the downlink signal as the beam that the UE used to transmit the SRS. This means that the UE does not need to report the beam quality; instead, the base station may perform the necessary beam measurement(s). Thus, when SRS is indicated, the UE may apply the same beam to receive the downlink signal as that used to transmit the uplink signal. It should be noted that the multiple SRSs may represent periodic and/or semi-persistent SRSs (i.e. SRSs transmitted according to semi-persistent scheduling), or they may represent aperiodic SRSs. Aperiodic SRSs are not transmitted according to any predefined periodicity or repeating schedule. There are a number of issues to consider in how SRS-based TCI may be implemented.

First Issue

Figure 6:
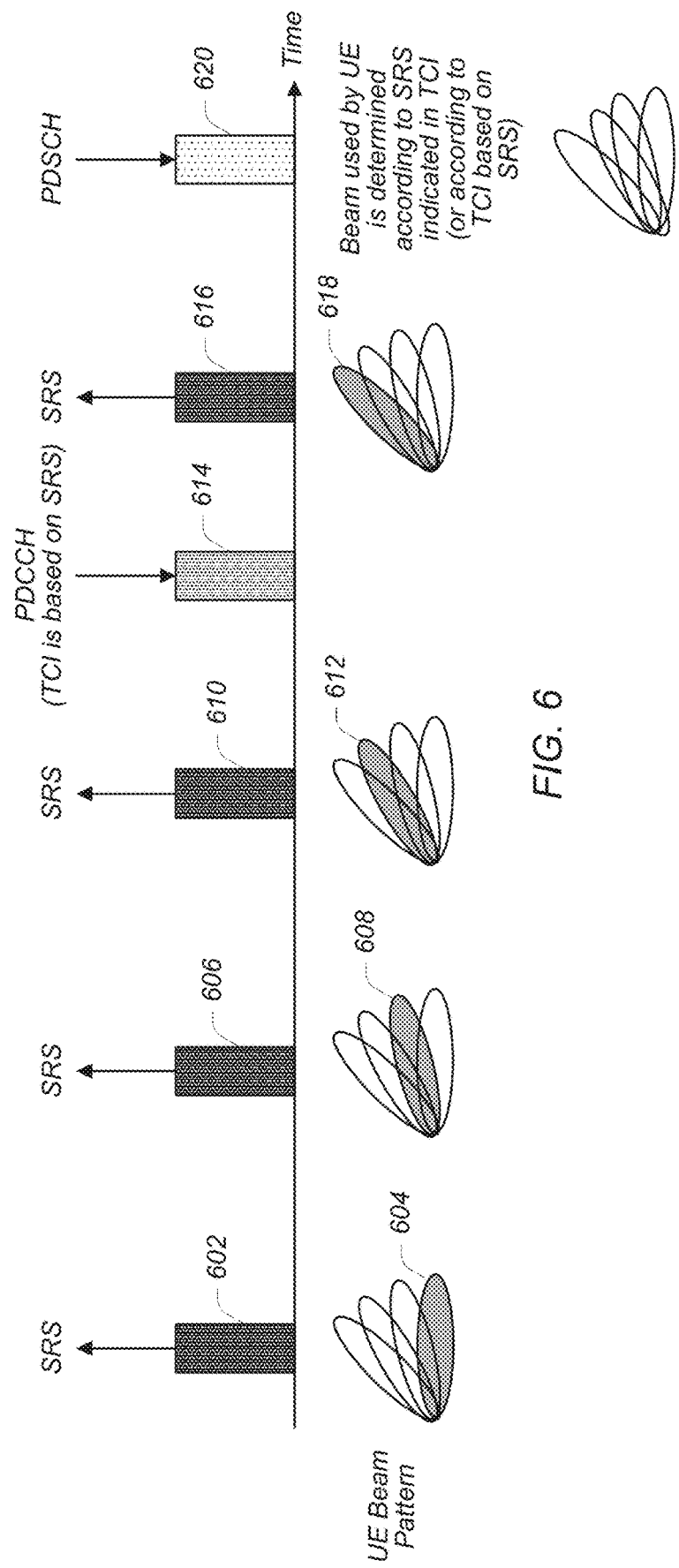
FIG. 6 shows a timing diagram illustrating SRS signaling, PDCCH transmission, PDSCH transmission, and corresponding beam patterns.

FIG. 6 shows a timing diagram illustrating SRS signaling, PDCCH transmission, PDSCH transmission, and corresponding beam patterns. In one sense, FIG. 6 illustrates how the UE may use different beams to transmit different instances of SRS. As shown in FIG. 6, beam 604 is used to transmit SRS 602, beam 608 is used to transmit SRS 606, beam 612 is used to transmit SRS 610, and beam 618 is used to transmit SRS 616. In FIG. 6, the PDCCH 614 is received between SRS 610 and 616, and the PDSCH 620 is received subsequent to SRS 616. As indicated in FIG. 6, the TCI in PDCCH is based on SRS, and due to the multiple instances of SRS transmitted using different respective beams, the question of which beam the UE is to use to receive PDSCH 620 remains open. In other words, since the UE may apply different beams in different SRS transmission instances, the behavior of the UE for receiving a downlink signal when SRS is indicated remains to be defined. In some embodiments, four options for defining the behavior of the UE under these conditions may be considered.

According to a first option, the timing of the SRS and the downlink beam reception for the corresponding PDSCH may be identified. In this scenario, the UE may apply the same beam as the beam used by the UE for transmitting SRS a specified number (K) of slots prior to receiving a corresponding downlink channel, after the SRS-based TCI takes effect. The specified number, e.g. K, may be defined according to one of the following:

K is predefined, e.g. 0, 4, etc.;
K is configured by higher layer signaling (e.g. RRC signaling); or
K is reported by UE capability signaling.

Figure 8:
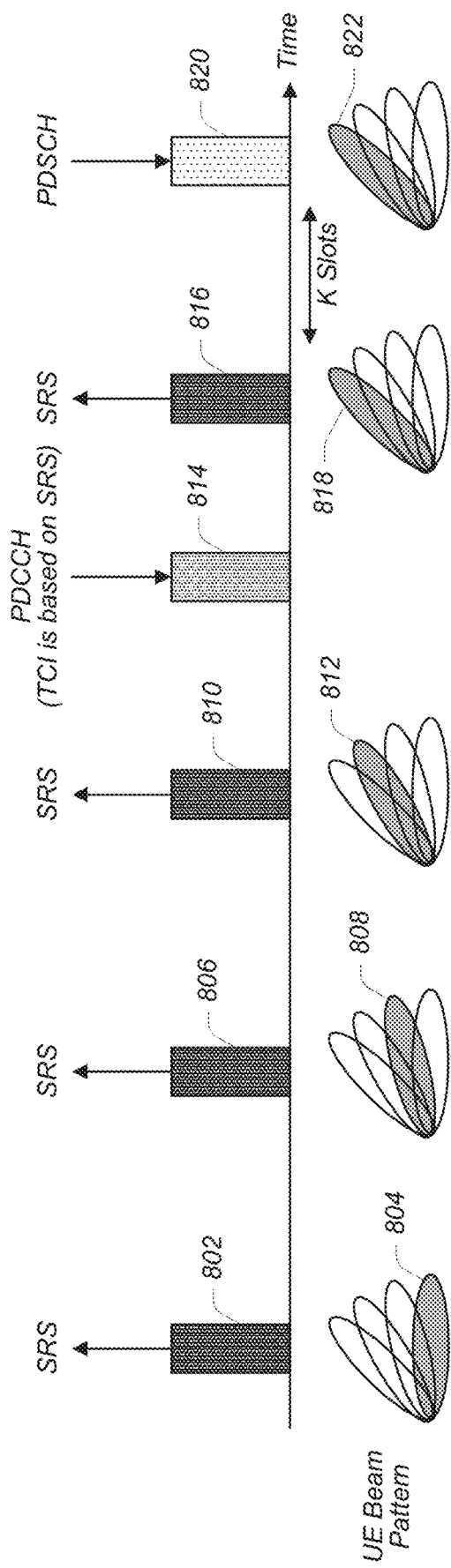
FIG. 8 shows a timing diagram illustrating SRS signaling, PDCCH transmission, and PDSCH transmission when using a beam based on the timing of the SRS and the downlink beam reception of the corresponding PDSCH, according to some embodiments.

This is illustrated in FIG. 8, which shows a timing diagram illustrating SRS signaling, PDCCH transmission, and PDSCH transmission when using a beam based on the timing of the SRS and the downlink beam reception of the corresponding PDSCH. As shown in FIG. 8, beam 804 is used to transmit SRS 802, beam 808 is used to transmit SRS 806, beam 812 is used to transmit SRS 810, and beam 818 is used to transmit SRS 816. PDCCH 814 is received between SRS 810 and 816, and PDSCH 820 is received subsequent to SRS 816. In FIG. 8, SRS 816 is transmitted a specified number (K) slots prior to PDSCH 820, and therefore beam 818 used by the UE to transmit SRS 816 is the same as beam 822 used by the UE to receive PDSCH 820.

According to a second option, the timing of the SRS and the downlink beam reception for the corresponding PDCCH may be identified. In this scenario, the UE may apply the same beam as that used for SRS transmission a specified number (K) of slots prior to receiving the scheduled PDCCH, after the SRS-based TCI takes effect. The specified number, e.g. K, may be defined according to one of the following:

K is predefined, e.g. 0, 4;
K is configured by higher layer signaling; or
K is reported by a UE capability signaling.

Figure 9:
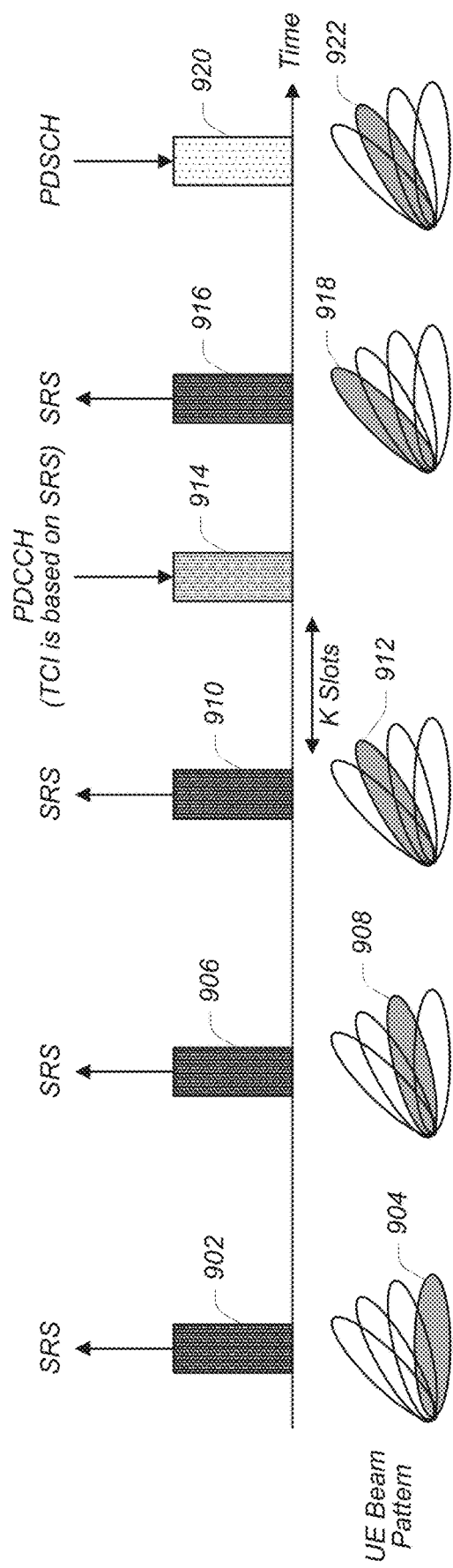
FIG. 9 shows a timing diagram illustrating SRS signaling, PDCCH transmission, and PDSCH transmission when using a beam based on the timing of the SRS and the downlink beam reception of the corresponding PDCCH, according to some embodiments.

This is illustrated in FIG. 9, which shows a timing diagram illustrating SRS signaling, PDCCH transmission, and PDSCH transmission when using a beam based on the timing of the SRS and the downlink beam reception of the corresponding PDCCH. As shown in FIG. 9, beam 904 is used to transmit SRS 902, beam 908 is used to transmit SRS 906, beam 912 is used to transmit SRS 910, and beam 918 is used to transmit SRS 916. PDCCH 914 is received between SRS 910 and 916, and PDSCH 920 is received subsequent to SRS 916. In FIG. 9, SRS 910 is transmitted a specified number (K) slots prior to PDCCH 914, and therefore beam 912 used by the UE to transmit SRS 910 is the same as beam 922 used by the UE to receive PDSCH 920.

Figure 10:
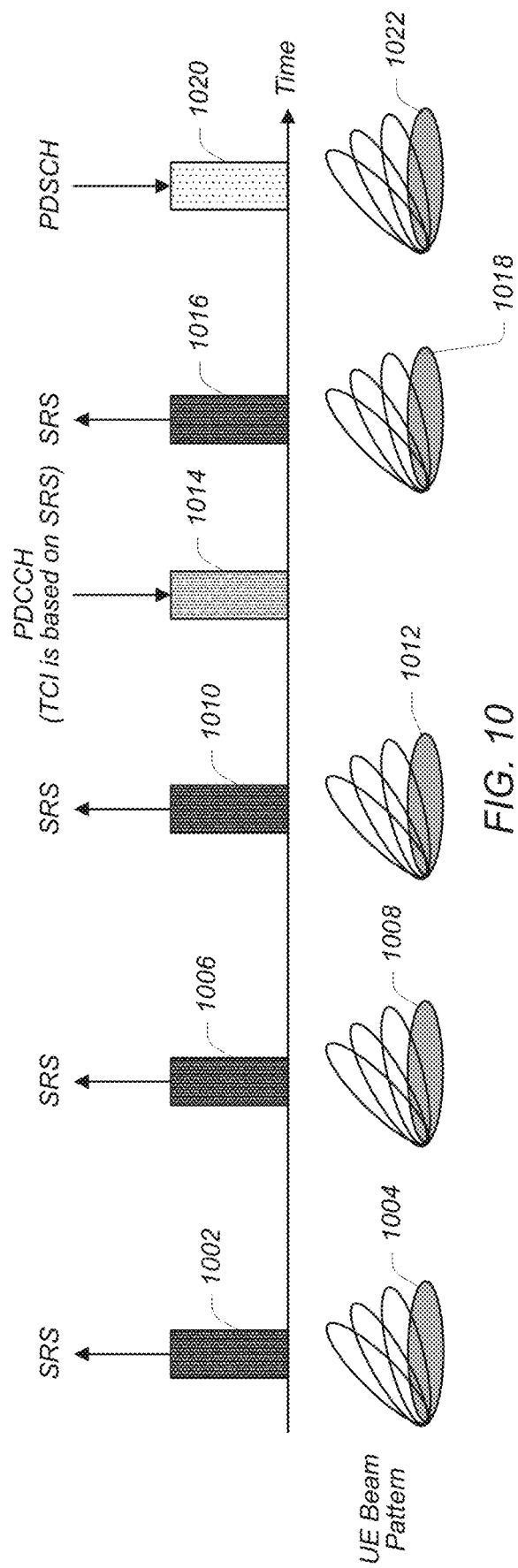
FIG. 10 shows a timing diagram illustrating SRS signaling, PDCCH transmission, and PDSCH transmission when using the same beam for all SRS transmission and downlink channel reception, according to some embodiments.

According to a third option, when periodic SRS or semi-persistent SRS is configured in a TCI state, the UE may not change the spatial transmission filter when not indicated by higher layer signaling. The UE may not need to check the beam for SRS resources, and an offset does not need to be defined. The UE may apply the same beam to receive the downlink signal indicated by SRS-based TCI as the beam used to transmit SRS. As an extension, the UE may also expect that only periodic and/or semi-persistent SRS is indicated in a TCI state. This is illustrated in FIG. 10, which shows a timing diagram illustrating SRS signaling, PDCCH transmission, and PDSCH transmission when using the same beam for all SRS transmission and downlink channel reception. As shown in FIG. 10, beam 1004 is used to transmit SRS 902, beam 1008 is used to transmit SRS 1006, beam 1012 is used to transmit SRS 1010, and beam 1018 is used to transmit SRS 1016. PDCCH 1014 is received between SRS 1010 and 1016, and PDSCH 1020 is received subsequent to SRS 1016. As illustrated in FIG. 10, beams 1004, 1008, 1012, and 1018 used by the UE to respectively transmit SRS 1002, 1006, 1010, and 1016 are the same, and they are also the same as beam 1022 used by the UE to receive PDSCH 1020.

According to a fourth option, only aperiodic SRSs may be configured (as an SRS) in a TC state. As previously mentioned, aperiodic SRSs are not transmitted according to any predefined periodicity or repeating schedule, in contrast to periodic and/or semi-persistent SRSs (SRSs transmitted according to semi-persistent scheduling). In cases where the SRSs are aperiodic, the UE may follow the spatial transmission filter for the most recently transmitted SRS—prior to receiving the downlink signal—to receive the downlink signal. That is, when only aperiodic SRSs are indicated to the UE in TCI, the UE may use the SRS indication to mean that the UE is to use the same beam to receive the downlink signal as the beam the UE used to transmit the most recent (aperiodic) SRS.

For all four options, when the spatial relation information (e.g. the number of slots as described above) for the SRS can be configured, the UE may follow the latest indicated spatial relation information for SRS to receive the corresponding downlink channel when SRS is configured in the UE's TCI state. Alternatively, spatial relation information for the SRS may not be configured in the TCI state.

Second Issue

As presently specified, for Control Resource Set (CORE-SET) 0 the CSI-RS indicated in TCI is expected to be quasi co-located (QCLed) with one Synchronization Signal Block (SSB), and the UE is expected to monitor the Search Space (SS) 0 and the CORESET 0 occasion that is associated with the SSB. It should be noted that in NR, a CORESET is a set of physical resources (e.g. a specific area on a downlink resource grid) and a set of parameters used to carry PDCCH/DCI. It may be considered the equivalent to an LTE PDCCH area (the first 1,2,3,4 OFDM symbols in a subframe). However, in the LTE PDCCH region, the PDCCH is spread across the whole channel bandwidth, while the NR CORE-SET region is localized to a specific region in frequency domain.

Figure 7:
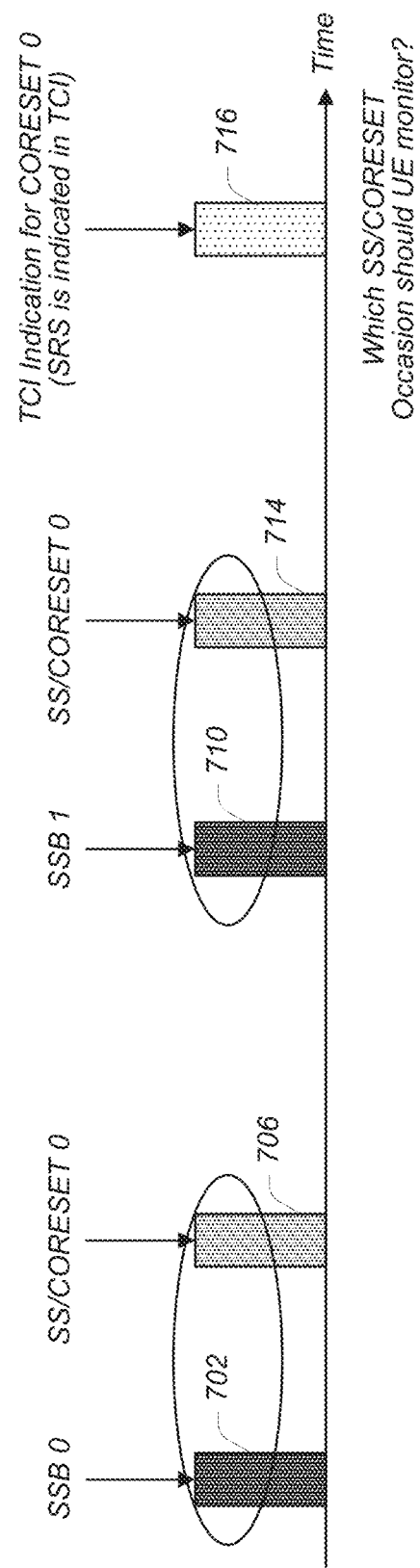
FIG. 7 shows a timing diagram illustrating SSB and SS/CORESET0 transmission, and TCI indication.

FIG. 7 shows a timing diagram illustrating the SSB and SS/CORESET, and TCI indication. In FIG. 7, the first instance of CORESET 0 (706) is linked to SSB 0 (702), which means they are expected to share the same beam. However, the second instance of CORESET 0 (714) is linked to SSB 1 (710), and similar to the first instance, they are expected to share the same beam. Therefore, beam selection for this scenario might present an issue. When the TCI indication for CORESET 0 (716) is based on SRS, the monitoring occasion for SS/CORESET 0 needs to be defined. In some embodiments, two options for defining the monitoring occasion for SS/CORESET 0 may be considered.

According to a first option, the TCI state with SRS as source reference signal may not be configured for CORE-SET 0. As a further extension, such TCI state may not be configured for any CORESET.

Figure 11:
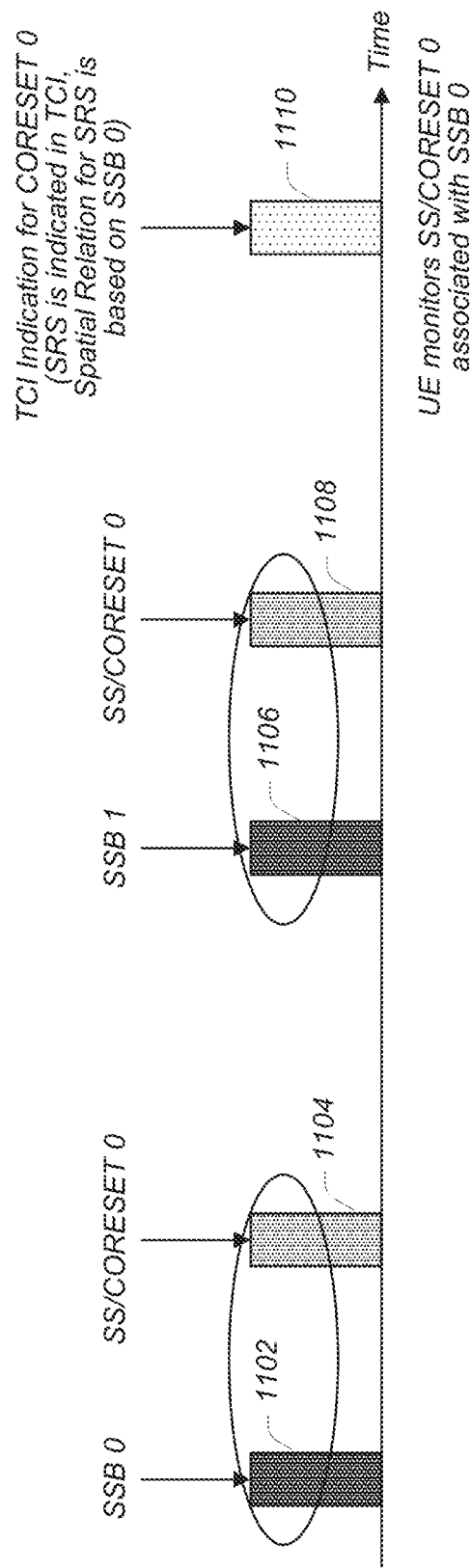
FIG. 11 shows a timing diagram illustrating SSB and SS/CORESET0 transmission, and TCI indication when the UE monitors SS/CORESET 0, according to some embodiments.

According to a second option, when SRS is indicated in a TCI state for CORESET 0, the spatial relation information for the SRS may be based on one SSB, i.e., configured for one of the SSBs. The UE may monitor the SS/CORESET 0 associated with the SSB until there is a new TCI indication for CORESET 0 or until a random access channel (RACH) procedure that is not initiated/triggered by a PDCCH order. This is illustrated in FIG. 11, which shows a timing diagram illustrating the SSB and SS/CORESET 0, and TCI indication when the UE monitors SS/CORESET 0. As illustrated in FIG. 11, the first instance of CORESET 0 (1104) is linked to SSB 0 (1102), and the second instance of CORESET 0 (1108) is linked to SSB 1 (1106). The TCI indication for CORESET 0 (1110) includes the SRS indication, and the spatial relation for SRS is based on SSB 0. Accordingly, the UE may monitor SS/CORESET 0 (1106) associated with SSB 0 (1102).

Third Issue

There are several types of SRS currently defined, e.g. SRS for codebook-based transmission, SRS for non-codebook-based transmission, SRS for antenna switching, and SRS for beam management, just to name a few. The SRS for antenna switching relates to downlink CSI measurement, where the UE may apply a different antenna port to a different SRS source feed and the base station may derive the downlink CSI from the measured reference signal. The SRS for beam management is used for uplink beam measurement. Due to the existence of several different types of SRS, the UE's QCL assumption for different types of SRSs needs to be considered. Another consideration is whether the SRS and the configured downlink channel may be transmitted in different serving cells.

Regarding the type of SRS that may be indicated in a TCI state, three options may be considered. According to a first option, only the SRS for beam management may be indicated. According to a second option, only the SRS for beam management and/or the SRS for codebook-based and non-codebook-based transmission may be indicated. According to a third option, all different types of SRS may be indicated.

The TCI state with SRS as source reference signal may be configured for the TCI state for all or a subset of a group of designated downlink signals which includes, but is not limited to, the PDSCH, CSI-RS with repetition=on, CSI-RS with repetition=off, CSI-RS with TRS-information configured, CSI-RS without repetition and without TRS-information configured, and CORESET.

Regarding QCL parameters that may be indicated by an SRS in a TCI state, two options may be considered. According to a first option, only spatial receiving parameters may be indicated by an SRS. According to a second option, all QCL parameters, including spatial receiving parameters, delay offset, Doppler shift, delay spread, and Doppler spread may be indicated by an SRS.

Regarding when SRS is configured in a TCI state, two options may be considered. According to a first option, the SRS may be in the same serving cell as the indicated downlink signal. According to a second option, the SRS may be in the same serving cell as the indicated downlink signal or it may be in a different serving cell. The serving cell index for the SRS may be configured by higher layer signaling, e.g. RRC signaling. As an extension, the bandwidth part (BWP) index for the SRS may also be configured by/through higher layer signaling.

Fourth Issue

For a UE with multiple panels, which may be able to transmit and/or receive signals from multiple base stations simultaneously, when SRS is indicated in a TCI state, the base station's assumption regarding simultaneous reception of multiple downlink signals needs to be considered. For example, it may need to be ascertained how the base station (e.g. gNB) may recognize that the downlink signals may be received by multiple panels. Regarding the base station's assumptions pertaining to simultaneous reception of multiple downlink signals, three options may be considered.

According to a first option, for a TCI state with SRS as the source reference signal, the base station may assume that the downlink signal with different TCI states cannot be received simultaneously.

Figure 12:
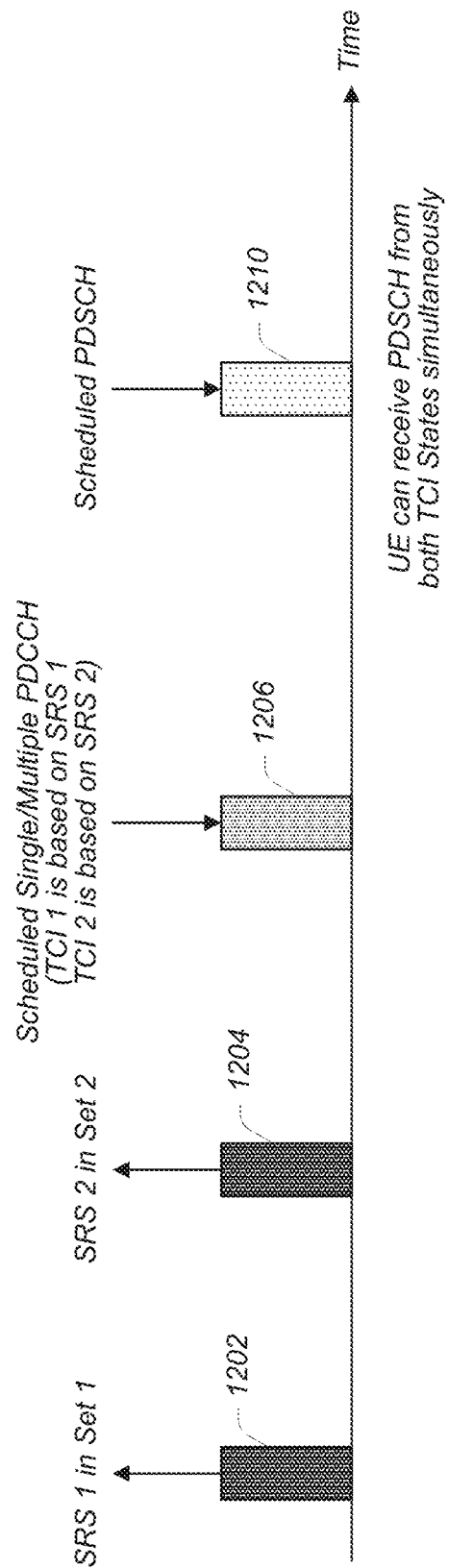
FIG. 12 shows a timing diagram illustrating SRS signaling, PDCCH transmission, and PDSCH transmission when the source SRS are configured in different resource sets with the same usage, according to some embodiments.

According to a second option, for a TCI state with SRS as the source reference signal, the base station may assume that the downlink signal with different TCI states can be received simultaneously when the source SRSs are configured in different resource sets with the same usage. This is illustrated in FIG. 12, which shows a timing diagram illustrating SRS signaling, PDCCH transmission, and PDSCH transmission when the source SRS are configured in different resource sets with the same usage. As shown in FIG. 12, SRS 1 (1202) is transmitted using resource Set 1, and SRS 2 (1204) is transmitted using resource set 2. The scheduled PDCCH 1206 (single or multiple) may include TCI 1 based on SRS 1 and TCI 2 based on SRS 2. The scheduled PDSCH 1210 is received by the UE from both TCI states simultaneously.

Figure 13:
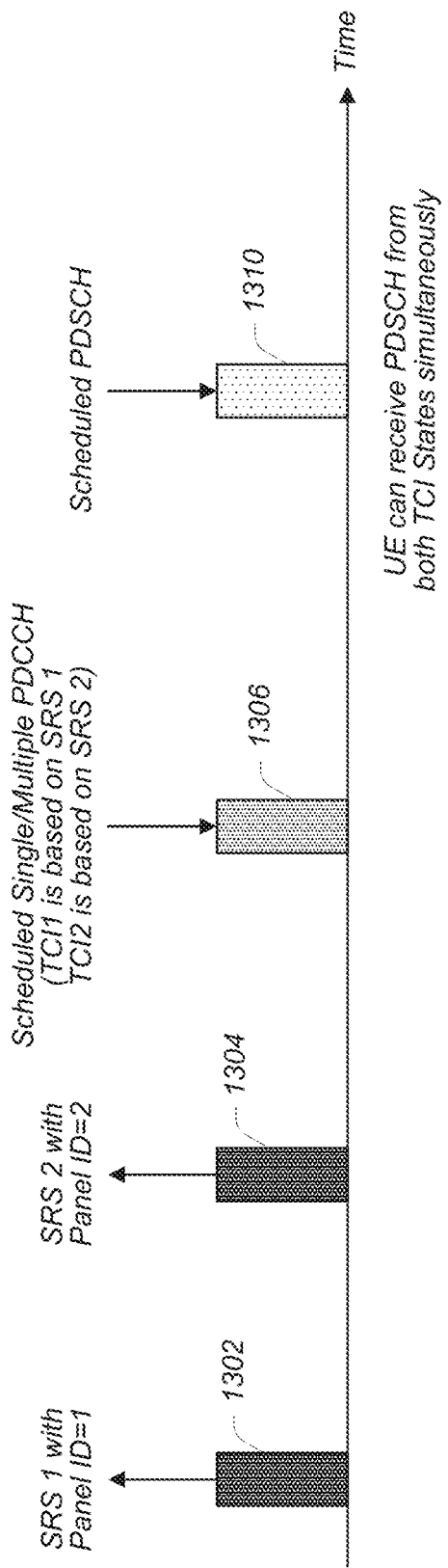
FIG. 13 shows a timing diagram illustrating SRS signaling, PDCCH transmission, and PDSCH transmission when the source SRSs are configured in different panel IDs with the same usage, according to some embodiments.

According to a third option, for a TCI state with SRS as the source reference signal, the base station may assume that the downlink signal with different TCI states can be received simultaneously when the source SRSs are configured in different panel IDs with the same usage. The panel ID may be explicitly defined/configured through higher layer signaling, e.g. via RRC signaling, or it may be implicitly derived based on the latest beam-reporting and the spatial relation information indicated for the SRS. This is illustrated in FIG. 13, which shows a timing diagram illustrating SRS signaling, PDCCH transmission, and PDSCH transmission when the source SRSs are configured in different panel IDs with the same usage. As shown in FIG. 13, SRS 1 (1302) is configured with panel ID 1, and SRS 2 (1304) is configured with panel ID 2. The scheduled PDCCH 1306 (single or multiple) may include TCI 1 based on SRS 1 and TCI 2 based on SRS 2. The scheduled PDSCH 1310 is received by the UE from both TCI states simultaneously.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for wireless communications between a device and a base station, the method comprising:
   successively transmitting multiple sounding reference signals (SRSs) to a base station;
   receiving in a transmission configuration indication (TCI) from the base station, at least in response to the base station receiving one or more of the multiple SRSs, an indication of a first SRS of the multiple SRSs, wherein transmitting the multiple SRSs comprises transmitting the first SRS using a first beam; and
   receiving from the base station, using the first beam at least in response to receiving the indication of the first SRS, a downlink signal corresponding to the first SRS.

2. The method of claim 1, comprising:
   transmitting the first SRS a specified number of slots prior to one of:
   receiving the TCI from the base station; or
   receiving the downlink signal from the base station.

3. The method of claim 2, comprising:
   receiving the TCI in a physical control channel corresponding to the first SRS.

4. The method of claim 2, comprising:
   receiving the downlink signal in a physical data channel corresponding to the first SRS.

5. The method of claim 2, wherein the specified number is one of the following:
   a predefined number;
   a number configured through higher layer signaling; or
   a number reported by device capability signaling.

6. The method of claim 1, comprising:
   transmitting each of the multiple SRSs using a same beam when the multiple SRSs are periodic or semi-persistent SRSs.

7. The method of claim 1, wherein the first SRS is a most recently transmitted SRS prior to receiving the downlink signal, when the multiple SRSs are aperiodic SRSs.

8. The method of claim 1, further comprising:
   identifying the first beam based on a latest indicated spatial relation information for SRS.

9. The method of claim 1, wherein a TCI state with SRS as source reference signal is not configured for one of:
   control resource set (CORESET) 0; or
   any of the CORESETs.

10. The method of claim 1, comprising:
    monitoring control resource set (CORESET) 0 associated with a specific synchronization signal block until one of:
    reception of a new TCI; or
    a random access channel procedure that is not triggered by a physical control channel order.

11. The method of claim 1, wherein the first SRS is one of:
    an SRS for beam management;
    an SRS for codebook-based transmission;
    an SRS for non-codebook-based transmission; or
    an SRS for antenna switching.

12. The method of claim 1, wherein the downlink signal is one of:
    a physical data channel;
    a channel state information reference signal (CSI-RS) with repetition on;
    a CSI-RS with repetition off;
    a CSI-RS with tracking reference signal (TRS) information configured;
    a CSI-RS without repetition and without TRS-information configured; or
    a control resource set (CORESET).

13. The method of claim 1, wherein transmitting the first SRS comprises transmitting the first SRS in one of:
- a same serving cell as the downlink signal; or
- a different serving cell than the downlink signal.

14. The method of claim 13, further comprising:
configuring through higher layer signaling one or more of:
- a serving cell index for the first SRS; or
- a bandwidth part index for the first SRS.

15. An apparatus comprising:
a processor configured to enable a device to:
- successively transmit multiple sounding reference signals (SRSs) to a base station, whereby a first SRS of the multiple SRSs is transmitted using a first beam;
- receive in a transmission configuration indication (TCI) from the base station, at least in response to the base station receiving the multiple SRSs, an indication of the first SRS; and
- receive from the base station, using the first beam at least in response to receiving the indication of the first SRS, a downlink signal corresponding to the first SRS.

16. A device comprising:
radio circuitry configured to enable wireless communications of the device; and
a processor communicatively coupled to the radio circuitry and configured to interoperate with the radio circuitry to:
- successively transmit multiple sounding reference signals (SRSs) to a base station, whereby a first SRS of the multiple SRSs is transmitted using a first beam;
- receive in a transmission configuration indication (TCI) from the base station, at least in response to the base station receiving the multiple SRSs, an indication of the first SRS; and
- receive from the base station, using the first beam at least in response to receiving the indication of the first SRS, a downlink signal corresponding to the first SRS.

17. The apparatus of claim 15, wherein the processor is configured to further enable the device to:
transmit the first SRS a specified number of slots prior to one of:
- receiving the TCI from the base station; or
- receiving the downlink signal from the base station.

18. The apparatus of claim 17, wherein the processor is configured to further enable the device to:
- receive the TCI in a physical control channel corresponding to the first SRS; and
- receive the downlink signal in a physical data channel corresponding to the first SRS.

19. The device of claim 16, wherein the processor is configured to further interoperate with the radio circuitry to:
transmit each of the multiple SRSs using a same beam when the multiple SRSs are periodic or semi-persistent SRSs.

20. The device of claim 16, wherein the processor is configured to further interoperate with the radio circuitry to:
identify the first beam based on a latest indicated spatial relation information for SRS.

* * * * *